(12) United States Patent
Wright

(10) Patent No.: US 7,259,656 B1
(45) Date of Patent: Aug. 21, 2007

(54) SYSTEM AND METHOD FOR DISPLAYING SAFE EXIT ROUTES DURING AN EMERGENCY CONDITION

(75) Inventor: Allen J Wright, West Linn, OR (US)

(73) Assignee: CH2M Hill Industrial Design & Construction, Inc., Portland, OR (US)

( * ) Notice: Subject to any disclaimer, the term of this patent is extended or adjusted under 35 U.S.C. 154(b) by 512 days.

(21) Appl. No.: 10/290,640

(22) Filed: Nov. 8, 2002

Related U.S. Application Data

(60) Provisional application No. 60/338,080, filed on Nov. 13, 2001.

(51) Int. Cl.
*G08B 25/08* (2006.01)
*G09B 29/10* (2006.01)

(52) U.S. Cl. .................. 340/286.14; 340/506; 340/533; 340/539.2; 340/628; 340/632

(58) Field of Classification Search ........... 340/286.14, 340/506, 533, 539.2, 628, 632
See application file for complete search history.

(56) References Cited

U.S. PATENT DOCUMENTS

| | | | |
|---|---|---|---|
| 5,297,252 A | * | 3/1994 | Becker ....................... 715/803 |
| 5,654,690 A | * | 8/1997 | Ishikawa et al. ............ 340/506 |
| 6,317,042 B1 | * | 11/2001 | Engelhorn et al. ...... 340/539.16 |
| 2001/0011946 A1 | * | 8/2001 | Horon ........................ 340/525 |

FOREIGN PATENT DOCUMENTS

JP 406004786 A * 1/1994

* cited by examiner

*Primary Examiner*—Jeffery Hofsass
*Assistant Examiner*—Samuel J Walk
(74) *Attorney, Agent, or Firm*—Innovation Partners; Charles E. Gotlieb

(57) ABSTRACT

A system and method displays a safe route from a location to a destination that avoids one or more hazards detected, such as a fire or a gas leak.

24 Claims, 8 Drawing Sheets

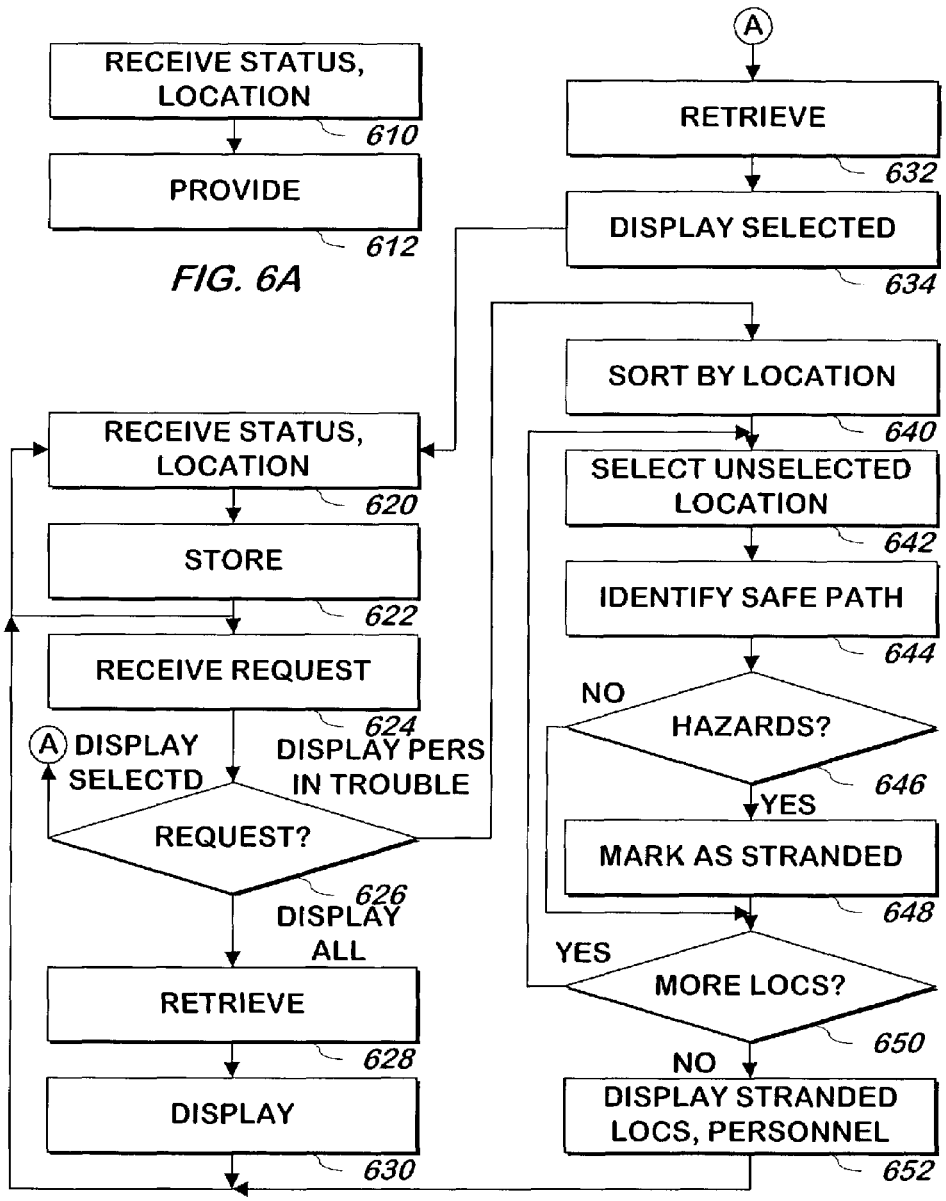

SYSTEM AND METHOD FOR DISPLAYING SAFE EXIT ROUTES DURING AN EMERGENCY CONDITION

RELATED APPLICATION

This application claims the benefit of U.S. Provisional Patent Application 60/338,080 Entitled, "Method and Apparatus for Displaying Safe Exit Routes During an Emergency Condition" filed by Alan J. Wright on Nov. 13, 2001, which is hereby incorporated by reference in its entirety.

FIELD OF THE INVENTION

The present invention is related to computer software and more specifically to computer software for facility safety.

BACKGROUND OF THE INVENTION

Many research and manufacturing facilities have equipment and materials that can pose a hazard to personnel during an emergency. For example, equipment can malfunction and catch on fire, and emit smoke or other dangerous gases or have other effects that can be hazardous to personnel using the manufacturing facility. Materials may be hazardous if exposed to personnel, or may be hazardous if improperly handled, for example, by mixing one harmless material with another harmless material that can produce a harmful compound.

When a hazardous condition exists in a facility, it may be desirable to direct personnel to a destination such as a nearest exit, a meeting area, or a supply of equipment that can protect personnel, address the hazard, or both. Different personnel may require different destinations when dealing with the hazard. For example, if a fire breaks out, some personnel may wish to locate the nearest exit that is safely accessible, while other personnel may wish to know where protective clothing and firefighting equipment may be located.

There have been proposed certain evacuation systems that can assist personnel in safely evacuating an area containing, or potentially containing, hazards. For example, the system described in U.S. Pat. No. 5,140,301, entitled, "Guidance Method and Apparatus in Case of Emergency Evacuation" addresses shining a laser light towards an emergency exit if a hazardous condition is detected to allow personnel to quickly locate an exit. However, such a system can actually be harmful if the emergency condition is near the emergency exit. For example, if the hazardous condition is a pending explosion that will occur near an emergency exit or a fire occurring immediately outside the exit, pointing to the exit may not be a benefit to the personnel. Even if the hazardous condition is nowhere near the emergency exit, if a hazard exists between the person and an exit, merely directing the person towards that exit can be harmful to that person because it directs him or her right into the hazard on the way to the exit. For example, a release of a cloud of odorless, colorless, poisonous gas halfway between an individual and an emergency exit is not best handled by pointing to that exit with a laser light. Furthermore, the aforementioned patent cannot respond to other information such as a suspected pattern of movement, such as the drift of a gas given the airflow patterns in a facility. Additionally, the patent addresses all hazards in exactly the same way: sending everyone to the exit, which does not assist those persons who may be able to address the hazardous condition or otherwise require a different destination.

Another system is that described in U.S. Pat. No. 4,347,499, entitled, "Emergency Guidance System", which addresses lamps embedded at the edges of an aisle in an airplane. Sensors near exit locations determine whether the exit location is safe to use and a chasing lamp pattern directs the passengers to the nearest safe exit, with detectors mounted at the exists determining which exits are safe. However, like the laser beam system above, the system does not address hazards to a user between a passenger and the exit, or suspected changes to the hazard. Furthermore, the system is expensive to install in a research, manufacturing or other facility where there are a multitude of paths one can take to reach an exit because each path must be marked. Furthermore, the user of such a system must watch the lamps constantly, because the user has no idea where the lamps will lead him or her. While this system can operate where there are few alternative paths, the paths are predictable and the paths do not cover significant distances such as in an airplane, in a research, manufacturing or other facility, if there are a multitude of alternate paths to a safe exit, and if those paths can be more than a short distance, such a system can slow the user's escape so much that it could be more dangerous to follow its direction than not to follow it. Furthermore, the system can force the user to watch the lamps so carefully, that the user would not notice subsequent hazards, like other users running into the same aisle.

It can also be desirable to predict hazardous conditions that may not be detected and to direct personnel to locations that avoid the predicted hazardous condition. For example, if smoke is detected, it can be desirable to direct personnel to exits upwind of the smoke, avoiding exits in the path of the smoke, to ensure that they are not directed into hazards not detected. None of the aforementioned patents takes into account the prediction of hazardous conditions that are not detected or directing personnel to locations that avoid the predicted hazardous conditions.

It can further be desirable to allow personnel to communicate with others such as rescue personnel so that they may request assistance or report circumstances which may not be known. None of the patents described above provides any capacity for such communication.

It can also be desirable to allow rescue personnel or others to track personnel who may be in a facility in which a hazardous condition has been detected. It can be especially helpful to inform personnel such as rescue personnel of the existence of other personnel who are stranded in a facility in which a hazardous condition exists with no means of escape that avoids all hazardous conditions. Such information can be used to allow rescue personnel to provide a means for escape for such stranded personnel. For example, if a fire is blocking the exit of a group of people with all other groups of people having a safe exit from the building, firefighters can focus their firefighting or rescue efforts on allowing the stranded group to escape.

During the occurrence of a hazardous condition, it may be desirable to optionally have access to information about the area in which the hazardous condition exists. Such information may include information about which chemicals in solid, liquid or gaseous form are in use at different areas around the area, the work in process in the area, permit information and other information to allow decisions to be made about how to respond to the hazardous condition. Such information can be used to determine not only how to escape, but also how to minimize damage from the emergency.

What is needed is a system and method that can direct a user to a destination using a safe path when a hazard exists in a facility, without requiring the user to stare at a sequence of chasing lamps to locate the safe exit, that can predict undetected hazardous conditions and direct users to the destination that avoids the predicted hazardous condition, that can allow personnel to communicate, that can track personnel and identify personnel stranded due to one or more hazardous conditions, and that can provide access to other information about the area near the one or more hazards.

SUMMARY OF INVENTION

A system and method receives information about one or more hazardous conditions and displays information about reaching a destination using a safe route that avoids one, some or all of the one or more hazards. The destination may include an exit, a meeting area, equipment or information for addressing the one or more hazards, equipment or information for minimizing damage from the hazard or further damage from the hazard, or may include any other form of destination. The display of information may include selecting or generating a map to the destination that describes or illustrates the shortest path to the destination or describes or illustrates the shortest path to the destination in conjunction with information regarding the capacity of that path. When determining the safe route, the system and method may take into account not only detected hazardous conditions, but also undetected potential hazardous conditions such as may be predicted due to airflow or wind conditions. The system and method may allow for communication between personnel or between personnel and others such as rescue personnel. The system and method may not only track the locations of personnel, but also identify those who may find all emergency exits blocked by one or more conditions such as hazardous conditions. The system and method may display other information about the area around the hazard such as information about chemicals used in certain machinery, information about work in process or other information that may be useful in addressing some or all of the hazardous conditions and/or minimizing the effects of the hazard.

BRIEF DESCRIPTION OF THE DRAWINGS

FIG. 6A is a flowchart illustrating a method of receiving tracking information for personnel according to one embodiment of the present invention.

FIG. 6B is a flowchart illustrating a method of providing information about locations of personnel according to one embodiment of the present invention.

DETAILED DESCRIPTION OF A PREFERRED EMBODIMENT

Figure 1:
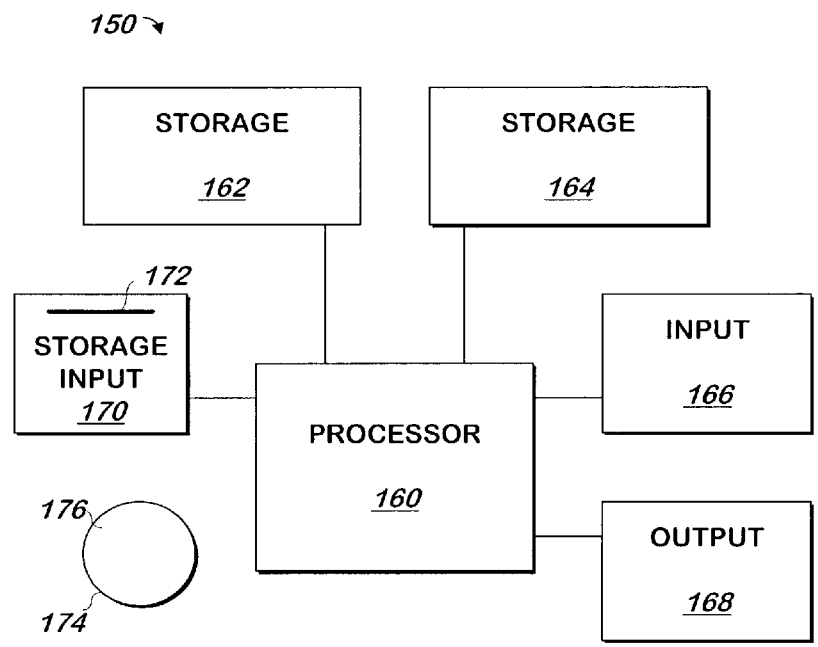
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT CORPORATION of Redmond Wash. or a MACINTOSH computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif., a personal digital assistant running the PALM operating system, such as the conventional Palm7 or M505 PDA, commercially available from PALM COMPUTING CORPORATION of Santa Clara, Calif., or a suitably equipped cellular telephone, although other systems may be used.

Referring now to FIG. 2, a system 201 for providing and displaying information about a safe route to a destination is shown according to one embodiment of the present invention. The safe route may be outside or indoors, such as a safe route among manufacturing machinery in a facility such as a semiconductor, medicinal, biotech or food manufacturing facility, such as a cleanroom. A safe route may be underground, in an open facility, through rooms or tunnels, or above ground. System 201 contains sensors 202–208 and at least one system 200 coupled via communication path 210.

A destination may be an exit, a meeting place, a location containing materials or information that may be used to address, or minimize the effects of, the one or more hazardous conditions or any other location that a person or a machine may wish to go when one or more hazardous conditions are detected or suspected. Thus, the present invention also applies to displaying a safe route to a fire extinguisher, a working telephone, the location of the most valuable set of work in process that may be evacuated from the one or more hazardous conditions, or any other location.

The present invention may be used to display safe routes to multiple destinations, for example, alternating between the above described destinations or allowing selection thereof, thereby allowing the present invention to address a variety of needs. Thus, the person or machine receiving the safe route or safe routes may include rescue personnel or machinery or may include non-rescue personnel or machinery, such as workers in a semiconductor fabrication facility who may wish to simply escape the facility at some time after a hazardous condition is detected.

As described herein, a safe route is any route in which a person can travel by avoiding at least one known hazard and/or suspected hazard which may result from a suspected or known hazard and optionally other information such as airflow patterns in a facility. A safe route may avoid all hazards or may not avoid all hazards: it may include one or more hazards, as long as at least one known hazard is avoided.

In one embodiment, sensors 202–208 placed at various locations throughout the facility generate input into the system 201 to allow system 201 to detect one or more hazards. Each sensor 202, 204, 206 or 208 detects one or more hazardous conditions, which may include any condition hazardous to a person or machine. For example, in one embodiment, sensor 202 detects smoke, sensor 204 detects excessive heat such as from a fire, sensor 206 detects poisonous gas, and sensor 208 detects equipment malfunction. There may be any number of types of sensors, and any number of each type of sensor used with the present invention.

Each sensor 202–208 provides to emergency condition detector 222 as described in more detail below one or more signals indicating whether or not an emergency condition is detected. Sensors 202–208 may provide this information to emergency condition detector 222 without any intervening processor or they may provide this information via a processor. For example, sensor 204 in the Figure may be part of a conventional fire alarm system for a building, and thus the output of the fire alarm processor 209 provides the signal to emergency condition detector 222. Although only one processor 209 is shown, any number of processors 209 may be used and each 209 may be coupled to any number of sensors 202–208 of any type.

In one embodiment, sensors 202–208 are installed throughout the facility in locations different from keyboard/display 234 and 234A–234D described below, or sensors 202–208 may be built into or nearby keyboard/display 202–208. In one embodiment, sensors are installed at all of these locations.

In one embodiment, signals from sensors 202–208 are provided to emergency condition detector 222 via communication interface 220. Communication interface 220 is a conventional communication interface that receives the signals at input 212 which is coupled to the sensors 202–208 via communication path 210. Communication path 210 may include conventional network equipment employing one or more shared paths to communication interface 220 and cabling including fiber optic or other types of cabling, a cable harness employing multiple connections, each connection dedicated to fewer than all of the sensors, conventional wireless communication equipment (using radio frequencies, infra-red or any other form of wireless communication), or any combination of these. Communication interface 220 may include a conventional communication interface that supports TCP/IP, Ethernet, Bluetooth, 802.11x, USB, Palm docking, FireWire, AppleTalk, RS-232 or other conventional communication protocols.

In one embodiment, some or all sensors 202–208 (or any processor 209 generating signals as a result of such sensors) transmit a signal to emergency condition detector 222 at regular intervals or irregular intervals having a maximum duration. Emergency condition detector 222 receives the signal and identifies which sensor corresponds to the signal received. Such identification may be performed physically, associating a cable with a sensor, or via a header or other identification capability in the signal received from the sensor or associated processor.

Emergency condition detector 222 maintains a data structure corresponding to the most recent state of each of the sensors 202–208, with an entry storing the signal received from each sensor, and an indicator of whether the sensor has detected a hazardous condition. In one embodiment, the indicators in the data structure are a series of bits, with each position in the series corresponding to one sensor. In one embodiment, for each bit, a value of '0' indicates no hazardous condition has been detected and a value of '1' indicates a hazardous condition has been detected by the corresponding sensor 202–208. If emergency condition detector 222 receives multiple hazardous condition signals, then multiple bits in the data structure are set to a value of '1' by emergency condition detector 222.

In one embodiment, emergency condition detector 222 translates the signals received from the sensors 202–208 or processor 209 by comparing the signal received from the sensor to an internally stored table to produce each indicator of the data structure. For example, if the signal indicates a temperature is not substantially above room temperature, emergency condition detector 222 translates the value of the signal containing the temperature into a '0' bit in the corresponding indicator, and if the signal indicates the temperature is substantially above room temperature, translates the signal into a '1' bit in the corresponding indicator, and stores the bit into the data structure.

It is possible that the signal received as a sensor signal corresponds to more than one sensor. For example, a signal from fire alarm processor 209 may indicate that any number of sensors may be detecting a fire. In such embodiment, emergency condition detector 222 may set multiple bits of the indicators corresponding to the state of the sensors from '0' to '1'.

In one embodiment, emergency condition detector 222 detects whether any sensor 202–208 has not sent a signal at a time in which such signal is expected. For example, in one embodiment, emergency condition detector 222 maintains a list of timestamps, one timestamp for each sensor 202–208 or processor 209. When a signal is received from a sensor 202–208 or controller 209, emergency condition detector 222 updates the timestamp for that sensor 202–208 or controller 209 in the list. Emergency condition detector 222 periodically scans the list of timestamps, and for each timestamp, subtracts the timestamp from the current time to produce a difference and compares the difference to an internally-stored list of maximums for each sensor 202–208 or controller 209. If the difference is greater than the maximum, perhaps indicating damage to the sensor 202–208, processor 209, or communication path 210, emergency condition detector 222 sets the bit corresponding to that sensor 202–208 or all of the sensors under control of a processor 209 to 1. Alternatively, emergency condition detector 222 sets a different bit in the data structure, with the different bit corresponding to the lack of communication with the sensor, to a value of 1 to allow the system to detect that a suspected hazardous condition has occurred but that no hazard has been reported by the sensor.

In one embodiment, if emergency condition detector 222 receives a signal indicating a hazardous condition, it signals alarm driver 224 to sound one or more emergency alarms via output 225, which may be coupled to visual alarms, such as flashing lights, or audio, such a loud siren, or any other alarm or combination of alarms. These alarms may be at or near a keyboard/display 234 described in more detail below to indicate the location of the keyboard/display 234 showing a safe route to a destination as described in more detail below, or the alarm may be placed at other locations. In one embodiment, alarm driver 224 may be coupled to a telephone line or wireless transmitter via output 225 to allow alarm to make telephone calls, for example to a pager, or signal a conventional wireless device such as a cordless telephone.

In one embodiment, emergency condition detector 222 sends the data structure holding the state of the sensors to map identifier 226 at intervals such as approximately every five seconds. In one embodiment, if map identifier 226 does not receive any transmission from the emergency condition detector 222, it considers this a particular emergency condition, and identifies a map indicating a problem with system 201, for display as described below.

When map identifier 226 receives the data structure containing the state of the sensors, map identifier 226 identifies a map that can illustrate a safe route to a destination that avoids one or more hazards detected by the sensors 202–208. In one embodiment, map identifier 226 is coupled to receive via input 240, which may be coupled via input 227 to a conventional keyboard and mouse, touch screen input or other conventional input device, an indication of the destination or type of destination via a user interface generated by map identifier 226. This indication may include a user identifier of the user which map identifier looks up in database 242 to identify the type of destination to which the user should be directed. For example, if the user is a firefighter, the type of destination may be the nearest fire fighting equipment location. Database 242 may be maintained by a system administrator. If no indication is received, map identifier 226 uses a default destination type, such as an emergency exit. In one embodiment, a user may select a destination type other than the default destination type or the destination type stored in database 242 for that user, such as the location of a meeting place, a location of a fire extinguisher, or a location of a gas mask. Map identifier 226 converts the user's selection into a numeric destination type code, for use as described below.

In one embodiment, the user can select as a destination type equipment that may be used to respond to the one or more hazardous conditions, and map identifier 226 uses the data structure holding the sensor state to determine as the destination type the most relevant response equipment corresponding to the one or more hazards corresponding to the sensor state. For example, if the sensor state indicates gas is detected, map identifier 226 determines the destination should be gas masks, the location of a gas supply shutoff valve or both. In one embodiment, each type of destination has a code and map identifier 226 appends the code to the indicators in the data structure holding the sensor state based on the default or any selection made.

Map identifier 226 can then use the destination appended to the indicators in the data structure and destination type code to identify a map or other description of a safe route to reach the destination. Although a map is used to visually describe the safe route in one embodiment, in other embodiments, a text description or even an audio description may be provided in place of the map described below. Such embodiments would allow blind persons to use the safe route to the destination, for example.

There are many ways of identifying a map of a safe route. In one embodiment, the identified map is selected from a set of predefined maps and in another embodiment, the map is identified by building the map from segments of available paths as described in more detail below although other map or description generation techniques may be used. The embodiment in which a map is selected from a set of prestored maps will be described first.

In one embodiment, the map or other description of the safe route to a destination or destinations of a selected type is provided on keyboard/display 234 as described in more detail below. That display may be fixed, e.g. a part of a touch screen CRT display mounted at specific locations in the facility. Keyboard/display 234 may include any conventional input device such as a touch screen or keyboard and/or mouse or may include no input device. In such embodiment, maps to all possible destinations from the location of the keyboard/display 234 showing safe routes under all possible sensor states are stored and one of these maps is selected and displayed, as described in more detail below. In another embodiment, the keyboard/display 234 is moveable, such as a display on a personal digital assistant or cell phone, and thus the map is selected not only with reference to the state of the sensors and the possible destinations, but also with reference to the location of the keyboard/display 234, detected as described in more detail below.

Maps may also be selected based upon the location of the display even if the display will remain in a fixed location. Such selection would be useful if it is desirable to use a common set of maps and programs for multiple systems 200, placed throughout the facility. In addition, such selection would also be useful if a single system drives multiple keyboard/displays 234 around the facility as described in more detail below. In such embodiment, the system would select different maps based upon the position of the display on which the map will be provided to the user. The embodiment in which a map is selected without regard to the location of the display will be described first.

In one embodiment, maps showing all possible safe routes to all possible destinations for all combinations of sensor states are stored by an administrator in map storage 230 via input 240. The maps may show the location of the one or more sensors and a description of the hazard as well as known features of the facility through which the safe route is desired. For example, the map may show a fire sensor reporting a fire as a set of flames at the sensor location or locations reporting the fire, and other sensors may be similarly depicted, and features of the facility may include diagrams of walkways and equipment. Each map illustrates a predetermined route to a destination that avoids one or more sensors capable of reporting a hazardous condition or not reporting a safe condition when the map is displayed, and may illustrate the shortest safe route between the display and the destination, such as an available exit (e.g. an exit not located near a sensor 202–208 indicating a hazardous condition when the map is displayed). Another map or message may be stored to indicate a system failure, for use in the case indicated above, in which map identifier 226 does not receive any data structure from emergency condition detector 222 or receives an erroneous one as detected by conventional error detection. In one embodiment, each map may illustrate a different route or destination that corresponds to the type of the destination selected or the default destination in use at the time the map will be displayed according to a particular sensor state. For example, if a data structure indicates that a gas is detected, any exit may be appropriate as an egress route, but if the data structure indicates that the hazardous condition is a fire, only fire exits may be appropriate as an egress route. Thus, different maps may be provided showing a different type of exit, and the maps may be selected based on the type of hazard being reported as described in more detail below.

To place maps into the system, each map showing a best safe route to the best or most appropriate destination for any combination of sensor states may be stored in map storage 230. In one embodiment, map storage is a conventional storage device containing addressable storage locations such as conventional memory or disk storage. Each map may be stored using a large number of storage locations in map storage. The indicators and optionally the destination type are used as an index into a table of storage location addresses stored in map address 231 that contain the storage location address of the map that should be displayed for the conditions corresponding to the indicators and optionally the destination type that provides the shortest safe route to the destination such as an exit. The address of the map in map storage 230 that should be displayed in the event of a particular sensor state and destination type selected is stored in the table at an address or offset corresponding to the bits in the indicators optionally appended to the destination type. Because the same map may be used to display a safe route for multiple sensor states, the use of an index also allows the same map to be specified for many sensor states and locations of keyboard/display 234. It is noted that if only one type of destination is allowed, the index to map address storage 231 may omit the destination type code.

To select a map from the set of predefined maps, map identifier 226 uses the indicators in the data structure, optionally concatenated with the destination type, as an index to the table in map address storage 231 to retrieve the address of the map stored for that sensor state and destination type.

Thus, if sensor 0 of four sensors is indicating a hazardous condition, and the destination type has an identifier 1111, the indicators in the data structure containing the sensor state 0001 appended to the location identifier 1111 would result in 00011111. The address stored at index 00011111 in map address storage 231 would be the address of a map showing a safe route from the display to the nearest or otherwise most appropriate destination corresponding to a destination type 1111 given the fact that a hazardous condition exists near or around sensor 0. In one embodiment, even if the destination is other than an exit, the map of a safe route to the destination also displays the nearest exit to the display that avoids the hazard reported by the sensors 202–208.

The location and nature of hazardous conditions may be frequently changing during an emergency as, for instance, a fire spreads or a gas cloud moves. Therefore, map identifier 226 periodically repeats the process of identification and display of the map as described herein, reflecting the latest sensor data and location data received by emergency condition detector 222 using the process for identifying a map described above.

In one embodiment, the indicators in the data structure corresponding to the state of the sensors can change over time as the hazard spreads without requiring any change in the sensor state. Because hazards may spread in predictable ways, e.g. clouds of gas or smoke will flow along the direction of air flows, the system can change the maps over time. In such embodiment, virtual sensors may be defined that do not correspond to a physical sensor 202–208. A virtual sensor has one or more indicators in the data structure corresponding to the sensor state and can be triggered from a physical sensor state detecting a hazardous condition, plus the passage of time or any other condition or sensor. When emergency condition detector 222 detects a hazardous condition as described above, it may set the indicator of the virtual sensors according to a set of rules it internally stores. The set of rules tells emergency condition detector 222 which virtual sensors to set at which time from the time a physical sensor is set as described above. The set of rules may take into account physical characteristics or type of the hazard and/or the area around the hazard, such as airflows, either predicted or sensed, causing a gas leak to migrate over time. In this manner, the indicators corresponding to the sensors will change over time, causing a different map of a safe route to be displayed according to the length of time the hazard has been detected. In one embodiment, when the sensor or sensors corresponding to the hazard no longer detect the hazard, emergency condition detector 222 clears the indicator corresponding to the virtual sensors either immediately or in the same order and using the same schedule as was used to set them, so that, for example, if a gas leak source is shut off, the virtual sensors begin to "detect" the elimination of the gas hazard in the same order as they were set, to correspond to the "end" of the gas leak moving with the airflow over time.

The set of rules used to set or clear virtual sensors may be based on the reading from still other sensors. For example, if one of the sensors 202–208 is a meteorological sensor, it may be used to detect wind conditions such as direction or speed or both. Such conditions may be detected inside or outside the facility or both. Emergency condition detector 222 may set or clear virtual sensors as a function of the wind condition reported by the meteorological sensor according to a location assigned to the virtual sensor, the location of the physical sensor reporting the hazard and optionally, the time since the physical sensor first reported the hazard. This would allow emergency condition detector 222 to set the indicator corresponding to a virtual sensor that is "located" just in front of an exit that is downwind of a fire detected at fire sensor 204 or smoke sensor 202 or poisonous gas sensor 206. As described below, if the virtual sensor is considered to be located in front of, and on the path to the exit, the exit will be considered "blocked" by the emergency condition "detected" by the virtual sensor and the system 200 will attempt to select another safe path.

In one embodiment, the set of rules takes into account input provided at keyboard/display 234 or received from another device via communication interface 220. This input may be provided via password control, allowing only firefighters or other specially assigned personnel to provide some or all of such input. A virtual sensor considered located in front of and on the way to a rooftop exit could be used to allow the path to that rooftop exit to be used as a safe path only if a helicopter was available or en route to evacuate personnel, and otherwise, the route to the rooftop exit would not be considered a safe path.

Any or all of these considerations could be used to set or clear virtual sensors. For example, a firefighter could provide input indicating that a helicopter was on its way, but virtual sensors considered located on the path to the rooftop exit could keep the exit off the safe paths if smoke and wind conditions might make a helicopter landing hazardous or impossible. If the wind shifted so that smoke was blown away from the rooftop, emergency condition detector 222 would no longer indicate the virtual sensor detected an emergency condition, allowing the path to the rooftop to be selected as a safe path.

The address of the map identified by map identifier 226 as described above is provided to map displayer 228 which retrieves the map from map storage 230 and graphically displays the map showing the safe path, and any associated textual information, on keyboard/display 234. In one embodiment, keyboard/display 234 includes a conventional display such as an LCD or CRT display and conventional display driver circuitry that can provide a visual display of information. In one embodiment, keyboard/display 234 may also be used by certain application programs such as those used to manage some or all of the facility or the workflow being performed in the facility. In such embodiment, keyboard/display 234 includes color coded buttons to allow a user to switch between such applications and the display of a safe path as described herein. The buttons may be displayed on the display screen, or may be physical buttons on the bezel of the display or on a keyboard nearby the display that is used to provide input to the applications.

In one embodiment the map identified by map identifier 226 is identified using the location of system 200 or the keyboard/display 234. In one embodiment, an administrator may enter the location of the system 200 or keyboard/display 234 to location identifier 232 via input 242 that may be coupled to a conventional keyboard (not shown) when system 200 or keyboard/display 234 is installed in a fixed position in the facility. In such embodiment, the location is retrieved from location identifier 232 by map identifier 226 and appended to the indicators and optionally the destination type code when map identifier 226 retrieves the map as described above. In such embodiment, maps are stored in map storage 230 for all possible combinations of potential locations of origin in addition to the combinations of indicators and destination types as described above. In one embodiment, the location code is not used and each map illustrates all of the destinations of the desired type, e.g. all fire exits or all exits that can be safely reached.

In one embodiment, keyboard/display 234, and optionally other portions of system 200, are located on a mobile device, such as a PALM 7 or M505 or other similar mobile device, including a cell phone, which may be carried throughout a facility. In such embodiment, input 242 is coupled (as indicated by the dashed lines in the Figures) to receive the location of system 200 from position sensor 236, which may contain a conventional global positioning system (GPS), or from a similar positioning system which detects the location of one or more users using position transmitters or receivers installed in the floor or ceiling at certain locations throughout the facility. When location identifier 232 receives the location of system 200 from position sensor 236 it identifies one of a number of predefined locations to which position system 200 is closest. The location of system 200 and the data structure containing the sensor state and optionally the destination type are used by map identifier 226 to select a map that illustrates a safe path given the location of system 200.

In such embodiment, portions of system 200 may be centrally located while other portions reside on the mobile device. For example, all but keyboard/display 234 may reside in a central location with position sensor 236 detecting the position of the mobile device using conventional personnel location devices. Map displayer 228 may include a conventional transmitter such as a wireless modem to transmit the map it retrieves to keyboard/display 234, which includes a conventional receiver such as a wireless modem, which receives the map and displays it. Alarm driver 224 may also broadcast the alarm via a transmitter and input 227 to map identifier 227 may also be coupled via a wireless modem to allow user to provide user input via the mobile device. Alternatively, communications interface 220 may transmit via a wireless transmitter the sensor state with the remaining elements 222–242 on the mobile device. Any combination of elements 220–242 may appear on wireless devices and a central location. Any number of wireless devices may be supported simultaneously by the components of the central location in one embodiment of the present invention, via multiplexing or other means, in a manner similar to that described below.

In the embodiment described above, multiple self-contained systems 212–256 may be used throughout a facility. In another embodiment, portions of system 212–256 may be shared. Referring momentarily to FIG. 2B, in one embodiment, system 200 has multiple keyboard/displays 234A–234D similar to keyboard/display 234 described herein at various locations around a facility. In such embodiment, other components of system 200 are shared among the multiple keyboard/displays 234A–234D. In such embodiment, the locations of each of the displays are provided by location identifier 232 using any of the techniques described above, and map identifier 226 not only receives the location from location identifier 232 but also receives from location identifier 232 an identifier of the display corresponding to the location. For each keyboard/display 234A–234D, map identifier sequentially selects a map for the corresponding location using the sensor state and optionally other characteristics as described above and sends it to map displayer 228 along with an identifier of the keyboard/display 234A–234D. Map displayer 228 routes the map to the corresponding display using the identifier of the display it received. A different destination type and other inputs may be received by map identifier 226 for each keyboard/display 234A–234D and map identifier 226 retains the destination type code for each identifier of the display to allow the type code for that display to be appended to the data structure corresponding to the sensor state to be used to select the map provided to the display as described above.

It isn't necessary to select a map using the data structure as an index to a map address, as other methods of selections may be substituted for that technique. The selection techniques described above are a representative sample of the selection of a map from a set of maps.

Referring again to FIG. 2A, in another embodiment, instead of selecting a map from a set of prestored maps, as described above, map identifier 226 programatically generates the map by identifying the "least cost" safe path between the location of the display and a destination having a type desired or a default type. In one embodiment, the least cost safe path to a destination is the safe path to the destination that may be taken in the shortest amount of time, although other metrics may be used to determine the least cost, such as available capacity of the path.

In one embodiment, in order to generate a map which displays the least cost safe path for a given sensor state and optionally a location identifier and optionally a destination type, a set of nodes, links between node pairs for which a path exists between the nodes, and landmarks are defined to map storage 230 via input 240.

Each node in the set of nodes may correspond to a point in a path near or at 1) a physical or virtual sensor location, 2) a predefined location or 3) the location of a destination such as an exit. A node identifier, a list of identifiers of neighbor nodes to which a path exists from the node that does not pass through another node, an identifier of the sensor to which the node corresponds, and optionally a position identifier of the node may be input to map storage 230 to define the node, the position identifier being a set of XY coordinates indicating the position of the node on a grid of the facility or area. One or more destination types such as "exit" may be assigned to destination nodes. A graphic for the node may be defined to indicate the hazard detected at that node if the sensor corresponding to the node indicates a hazardous condition.

The links between pairs of nodes between which a physical path exists are also defined to map storage 230 via input 240 to describe, or provide a graphical representation of, the shape of the path from one node to the other (e.g. to match the shape of the physical path a person would take to get from the position of one node to another), and a cost metric such as the time required to get from one node to the next.

Landmarks may be defined to map storage 230 by providing a graphic or text or both to describe the landmark as well as an indication of a position of the landmark, such as a set of XY coordinates of the landmark on a grid of the area or facility.

As described in more detail below, to generate a map, map identifier 226 uses the indicators representing the sensor state to build a graph corresponding to nodes not corresponding to a hazardous condition and the links between such nodes, and uses the graph, the location of the display and the type of destination to identify the least cost safe path from the location to the destination.

In one embodiment, map identifier 226 uses the indicators of physical and optionally, virtual, sensors to remove from consideration nodes corresponding to sensors having an indicator indicating a hazardous condition, and any links to or from those nodes. Using the remaining nodes, map identifier 226 implements a shortest path algorithm to identify the least cost path from the location to the destination by identifying the path from the source to the destination that uses links having the minimum total cost. In one embodiment, a shortest path algorithm may be an algorithm that assesses the cost of all paths to all destinations having the type corresponding to the selected type or default and selects the one with the lowest sum of the costs assigned to each link on the path. In another embodiment, a shortest path algorithm is a conventional shortest path algorithm, such as the conventional Dijkstra's Shortest Path First algorithm described at Moy, OSPF: Anatomy of an Internet Routing Protocol (Addison Wesley, 1998), or those described in Moy, OSPF Complete Implementation (Addison Wesley 2001) or any other routing algorithm.

Figure 4A:
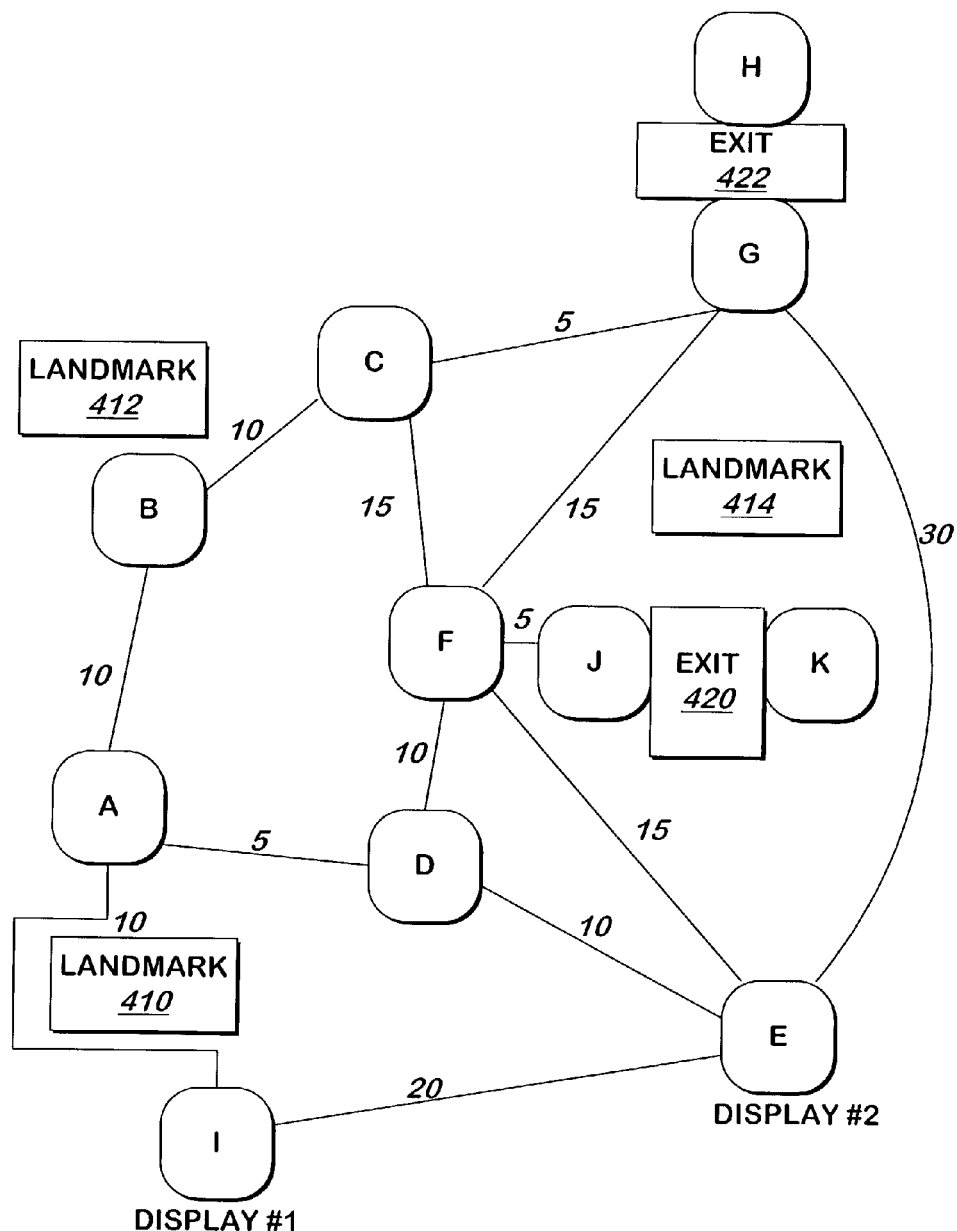
FIG. 4A is an illustration of nodes and links that may be used to generate information about a safe route to a destination according to one embodiment of the present invention.

Referring now to FIG. 4A, available map information including nodes and link information used to calculate the shortest safe path from a location to a destination having a type "exit", is shown according to one embodiment of the present invention. In FIG. 4, nodes A through K represent positions throughout a facility along escape routes, positions near exits, both inside and outside the facility, and elsewhere in the facility, for which presence of hazardous conditions may be identified (e.g. via detection or prediction as described above) via sensors placed at or nearby the sensors or using other conditions near the area such as airflows as described above as well as potential locations of origin, such as a location of a display as described above. As described above, nodes may be defined by associating the node with a physical or virtual sensor, and optionally and optionally by defining a position of the node. Links are defined by identifying the pair of nodes between which the link exists and information such as a drawing or other graphical information of a shape of the path from one node to the next as well as including a cost for the link. For example, the numbers along each path in the Figure connecting the nodes represent the number of seconds it would take for a person to travel between a map display, sensors, and an exit, either estimated or timed. In one embodiment, landmarks 410–414 may be a part of the map information to assist a person in finding his or her way along the indicated path. As described above, landmarks may be defined by providing an icon for the landmark and an identifier of the position of the landmark. In the drawing, only three landmarks are shown to avoid cluttering the Figure, however, any number of landmarks may be used.

If the location of the display is defined as location I, map identifier 226 identifies the least cost path to the nearest destination node having the desired type, such as type "exit." If the indicators show no hazards, map identifier 226 identifies the least cost paths to each of the exits 420 and 422 and then selects the shortest of those. In one embodiment, map identifier 426 tests all possible paths to exits 420 and 422 and then selects the one with the least total costs of all the links traversed. Such least cost path in the Figure is around the landmark 410, to node A, then node D, node F, then node J, and finally node K, which is defined as a node corresponding to a destination type exit and corresponds to the exit 422. In one embodiment, node K corresponds to a sensor located outside the exit to detect hazards outside of the exit, and thus, node K is defined as the node having a type exit, and node K has a zero or other minimal cost from node J. If no sensor was available to detect the presence of a hazardous condition at node K, node J would be assigned a destination type exit. It is noted that a node may have more than one destination type, for example, if a fire extinguisher were located at node J (and node K was not defined as described above), node J could be defined as having a destination type "exit" and a destination type "fire extinguisher".

If the sensor state indicated a hazard such as a fire at node F (either from physical sensors or virtual sensors), map identifier 226 will remove from consideration node F and links that include node F. Map identifier 226 will then identify the least cost path from the location to the node having a type desired using the remaining links and nodes using the same techniques as described above.

Map identifier 226 then builds a map of the shortest safe path from the location to the destination and provides it to map displayer 228 for display as described above. Alternatively, map identifier 226 may store into map storage 230 the map it generates and signals map displayer 228 with the address of the map and optionally the identifier of the display in the embodiment in which multiple displays are supported by a single system 200 as described above.

To build a map, map identifier 226 retrieves the information regarding the nodes and links defined to map storage 230 as described above corresponding to the nodes on the least cost path identified as described above, and adds the illustration of the path between each pair of nodes using the position information about the nodes to determine the position on the map of the endpoints of the paths. The illustration may come from the graphics defined with the link between nodes or it may be graphically generated by map identifier 226 using description information about the path defined with the link. If there is more than one path between a pair of nodes, map identifier 226 selects the one with the lowest cost. Map identifier 226 then retrieves some or all of the landmarks and adds them to the map according to their positions stored in map storage 230. Map identifier 226 may then optionally add graphical information about the nature of the hazardous condition or conditions detected, such as by using graphical information defined with the node as described above. It is not necessary to display such nodes corresponding to hazards or nodes not corresponding to hazards: the Figures show the nodes for ease of understanding.

Figure 4B:
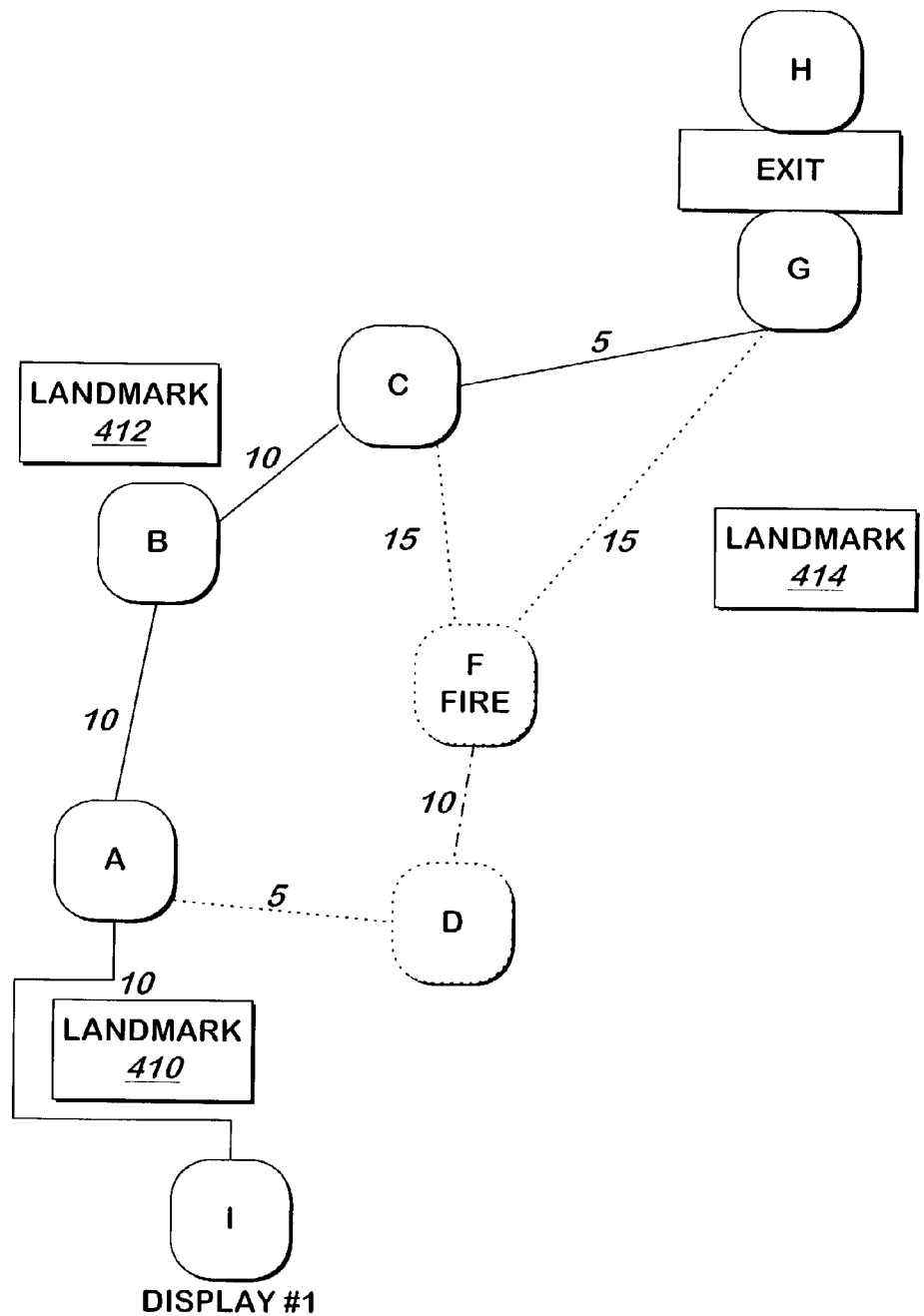
FIG. 4B is an illustration of a representative map of a safe route to a destination according to one embodiment of the present invention.

Referring now to FIG. 4B, an illustration of a representative map of a safe route showing the path from location I to the nearest node having a destination type of "exit" is shown according to one embodiment of the present invention. If sensor F detected a fire, then display #1 would map a safe route illustrating the least cost safe path from display #1 to an exit, which is a path around landmark 410, to node A, then node B, past landmark 412, to node C, then node G, and finally node H corresponding to exit 422.

Figure 2A:
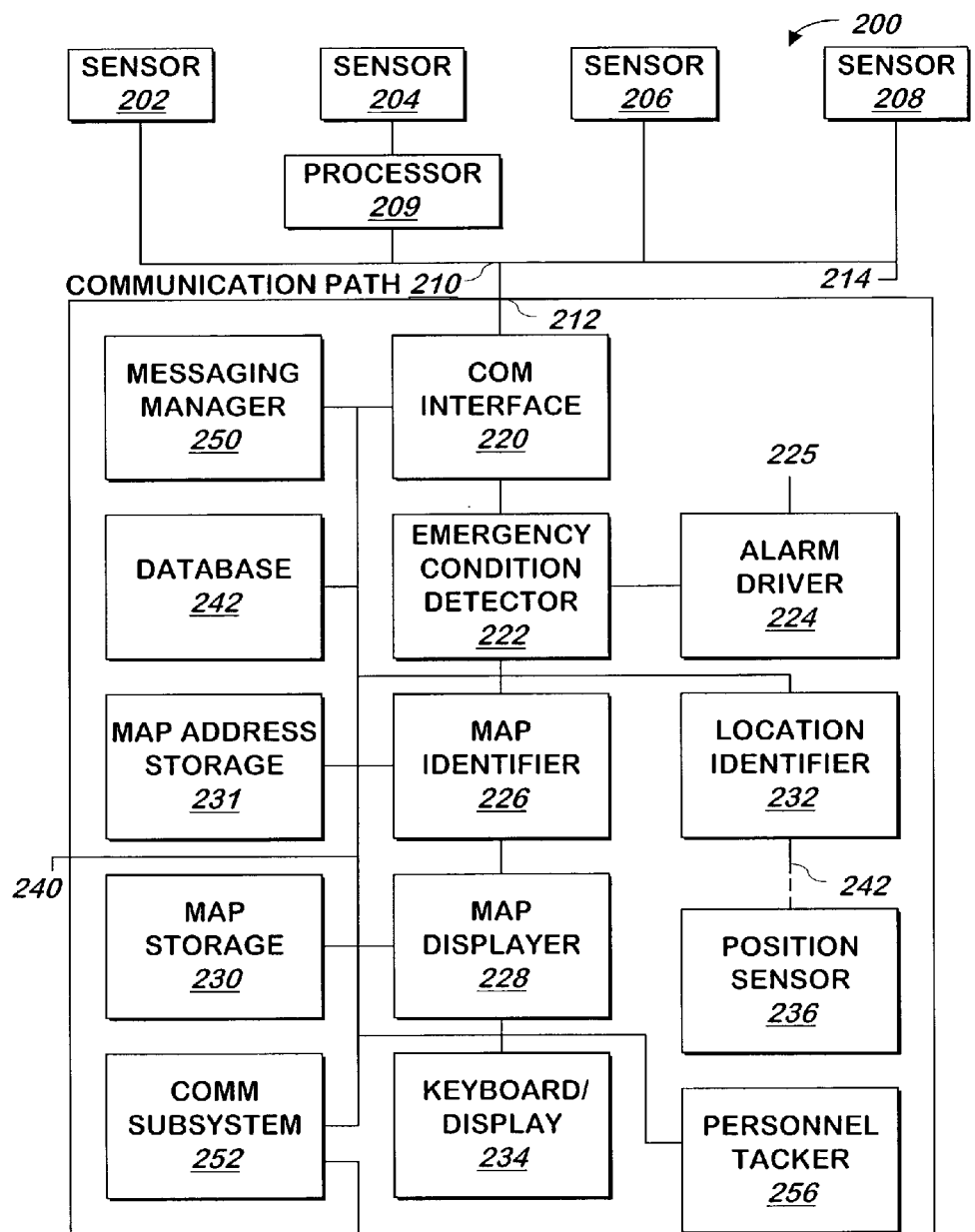
FIG. 2 is a block schematic diagram of a system for identifying and displaying information about a safe route to a destination according to one embodiment of the present invention.
Figure 2B:
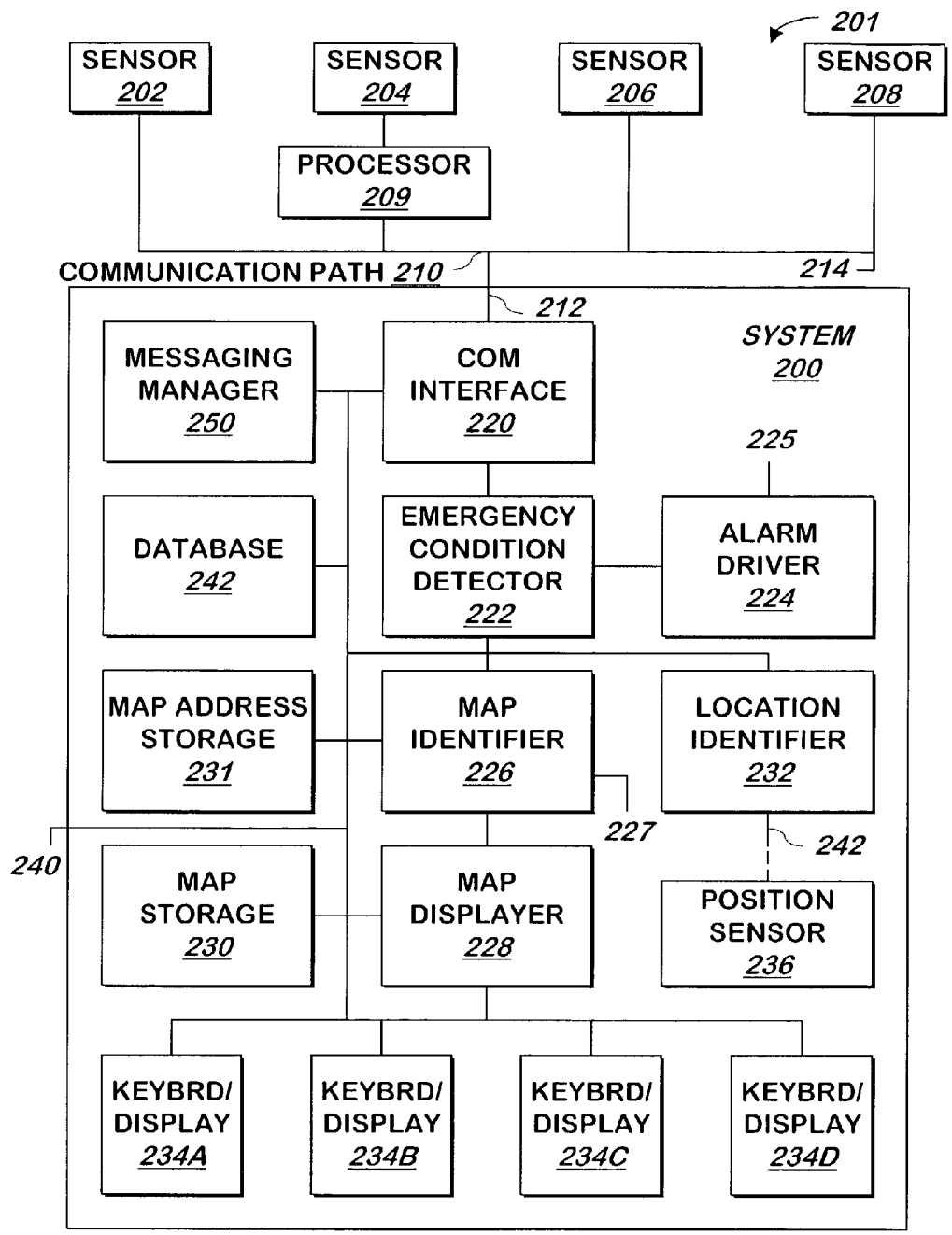

Referring now to FIGS. 2A and 4B, in one embodiment as described above, map identifier 226 adds to the map it generates graphical information indicating the location and nature of the hazard at the node corresponding to point of detection of the hazardous condition, such as may be used to assist emergency personnel, and may or may not illustrate paths to that node, such as is illustrated by the dashed lines in the Figure.

In one embodiment, a user may request from map identifier 226 information about the area other than the safe path to the destination. Such information may include information about which chemicals in solid, liquid or gaseous form are in use at different areas around the area, the work in process in the area, permit information and other information to allow decisions to be made about how to respond to the emergency. In such embodiment, such information is loaded into database 242 and may be retrieved from database and provided to map displayer 228 for display on keyboard/display 234 or any of keyboard/displays 234A–234D upon request by a user using a user interface generated by map identifier 226 and displayed via keyboard/display 234 or 234A–234D and map displayer 228. In one embodiment, the information in database 242 is indexed to the nodes corresponding to the sensors, and so map identifier 226 can retrieve from database 242 information about the area nearby those nodes corresponding to sensors (physical or virtual) for which an indication of a hazardous condition is stored in the data structure corresponding to the sensor state.

When all of sensors (either physical only or physical and virtual) indicate no hazardous conditions exist, emergency condition detector 222 or map identifier 226 signals alarm driver 224 to discontinue the alarm.

As used in this application, "or" means either, or both. Thus, "A or B" means A, B, or A and B.

In one embodiment, certain personnel may log into map identifier 226 and request a status report. The log in may be accomplished via a username and password that identifies the user as that certain personnel (the identification being inherent in the username/password or being stored in database 242 which is used to match the username and password and identify the status of the user as being security personnel), or by merely making the request. Map identifier 226 uses the data structure it receives from emergency condition detector 222 to build a map showing sensor states or to retrieve a map showing sensors and displays a list of the states of those sensors. In one embodiment, map identifier 226 internally stores the sensor state from one or more prior periods (e.g. using ten minute periods) to allow map identifier 226 to display on keyboard/display 234 the progression of one or more hazardous conditions by displaying a series of maps showing the change in sensor state in the form of an animation, or displaying a table of the sensor states, with each column representing successive periods to allow security personnel to compare the figures in the table or both of these. Either the table or the map may indicate actual readings from the sensors, rather than merely the binary indications described above. In such embodiment, emergency condition detector 222 stores the readings from each sensor in the data structure having the same order as the data structure to allow the actual readings from the sensors to be displayed as described above, or for an appropriate conversion to be displayed instead. For example, the sensor may indicate a temperature, but a conversion from the sensor scale to a temperature scale such as Celsius is performed by map identifier 226 before displaying the number or keyboard/display 234.

In one embodiment, a messaging manager 250 provides help messages to users who require additional information and allows communication with, or reports information to, a central management terminal or any system 200 to which certain personnel have identified themselves, for example, using a password. This allows personnel who are in the area of the hazard to use messaging manager 250 to communicate with rescuers and other personnel.

To initiate the capabilities of messaging manager 250, the user presses a touch screen button or a button on the front of keyboard/display 234.

Messaging manager 250 then provides a user interface to keyboard display 234 to allow a user retrieve help messages internally stored in messaging manager 250 or establish a chat session with other personnel. To request additional information, the user presses a touch screen button or uses another conventional user interface provided by messaging manager. The user may retrieve help messages such as CPR instructions, information about how to operate system 200 or other messages internally stored by and provided by messaging manager 250.

A user may also use the user interface to provide a command to establish a communication session such as a chat session with another user at a different system 200 (not shown) and then to chat with one or more other users. When messaging manager 250 receives the command or chat message, it retrieves from location identifier 232 the location of the keyboard/display from which the command was received and appends the location of the keyboard/display 234 from which the command was received or both, and broadcasts via communication interface 220 the command to other systems 200 (not shown) or sends the command to a designated system 200 (not shown) or another computer system, which may be monitored by security personnel. In the embodiment in which multiple keyboard/displays 234A–234D are used, messaging manager 250 identifies the keyboard/display 234A–234D from which the command was received, for example, by matching the port or address from which the message was received to the location of the individual keyboard/display 234A–234D, or using another similar technique.

Other systems (similar or identical to system 200 or capable of receiving any form of communication provided by system 200 as described herein), referred to as "remote systems" are interconnected to system 200 via input/output 214 or via other conventional communications capabilities that may be supported by communications interface 220. Designated ones of these other systems or all such systems receive the commands and chat messages from messaging manager 250 and display the chat messages on one or more of the keyboard/displays 234 of the designated system. The location of the user is also displayed by messaging manager 250 on the keyboard/display 234 of the remote system 200 or systems 200 into which security personnel are logged in to messaging manager 250 in a manner similar to that described herein.

In one embodiment, all commands and subsequent chat messages are sent addressed to a predetermined system 200 that serves as a security console. In another embodiment, certain users can configure any of the systems as being capable of receiving commands and chat messages, such as via a touch screen button or logging in using a password. In such embodiment, commands and chat messages may be broadcast to multiple systems 200 with only those configured to receive the commands and chat messages taking any action in response, such as displaying the message and allowing a response.

Security personnel or other users can use messaging manager 250 in a remote system to receive, and be able to respond to, communications with the user who sent the command. Security personnel can also send broadcast messages to all systems or to an individual system. As described above, the messaging manager 250 in the sending system 200 retrieves the location of keyboard/display 234 of the sending system 200 from location identifier 232 and provides it with any communication. Because the communications are received with a unique identifier of the location and the sending system 200, the receiving messaging manager 250 can provide this information to the security personnel who will receive the communications.

In one embodiment, system 200 allows voice communication with other systems 200 via communication subsystem 252. Communication subsystem 252 may contain a conventional microphone and speaker, such as would be contained on a conventional telephone handset, to allow such communication to be made by voice. When the handset is lifted or communication subsystem 252 is otherwise signaled (either via a touch screen button or via remote activation from a security console), the user is automatically connected to a handset or speaker and microphone coupled to communications subsystem 252 on at least one other system 200 monitored by security personnel or to a conventional phone line such as a cell phone dialed by communication subsystem. Such communications may travel via communications interface 220, or via a radio transmitter or conventional phone line coupled to input/output 254.

In one embodiment, each communications subsystem 252 retrieves the location of the corresponding keyboard/display 254 from location identifier 232 and provides it with any communication. The receiving communication subsystem 252 displays the location received on the keyboard/display 254 to allow the recipient of the voice communication to identify the location of the user, if at least the microphone of communications subsystem 252 is located near the keyboard/display 254. In the embodiment in which multiple keyboard/displays 254A–254D are operated as part of a single system 200, communication subsystem 252 identifies the particular communications subsystem 252 the user is using, for example using the port from which the communication is being received, and retrieves the corresponding location from location identifier 232.

In a manner similar to that described herein, communication subsystem 252 may allow broadcast to all remote systems 200 with only designated or properly configured remote systems 200 reproducing the communications in a manner similar to that described above. Communications subsystem 252 may also be configured (such as via a password) to broadcast messages to communications subsystem on all systems coupled to system 200, so as to allow announcements to be made.

In one embodiment, any of the forms of communication described above may be used between security personnel communicating via different systems 200. Thus, security personnel may communicate via chat or voice and such communications are broadcast to and displayed by all other systems 200 on which a security personnel is logged in.

In one embodiment, personnel tracker 256 assists in the tracking of personnel by system 200. Personnel tracker 256 contains a conventional card reader or transponder receiver that may be used to track personnel in the area of a keyboard/display of each system 200. A user can use the card reader to identify his or her location to the system 200 or the transponder worn or held by the employee can identify the employee automatically, and personnel tracker retrieves from location identifier the new location of the keyboard/display near personnel tracker 256 and broadcasts it with the identifier of the card or transponder (which in turn corresponds to the employee) to other personnel trackers 256 in other systems. A touch screen list of employees displayed by personnel tracker 256 may also be used to allow employees to identify their locations to personnel tracker 256: when the employee touches a button near his or her name, personnel tracker receives an indication of the button press and identifies the employee at the location of the keyboard/display from which the button was pressed. Each personnel tracker in each system 200 stores the identifier of the employee (e.g. the identifier of the card or transponder) and the last received location for that employee with a timestamp. Each card or transponder contains a unique identifier of the employee, and personnel tracker 256 receives these identifiers and periodically broadcasts them to personnel trackers 256 of other systems via communication interface 220 or via input/output 254. In one embodiment, personnel tracker 256 checks to determine if the location it will broadcast is the same as the location already stored for that employee and if so, suppresses the broadcast of such duplicate information.

Security personnel can log into any personnel tracker 256 and view the location of the nearest keyboard/display 234 of all personnel or a single person or all persons at a location or a range of locations or within a certain distance of a location. Personnel tracker 256 uses the list of personnel and locations it stores to provide such a list to keyboard/display 234.

In one embodiment, security personnel can log into personnel tracker 256 and request a list of personnel at locations for which there is no safe route to an exit or other destination type that does not pass through or near a hazardous condition. Personnel tracker 256 sorts the list of personnel and locations and then, for each location, sends the location and the destination type to map identifier 226. If no destination type is specified by the security personnel, an "exit" destination type is used as the default. Map identifier 226 determines if there is no safe route from the location by attempting to identify a safe route as described above, but using the location provided by personnel tracker 256 instead of the location provided by location identifier 232 and returns to personnel tracker 256 an indication of whether there is no safe route and the location. Personnel tracker 256 marks on the sorted list all locations for which there is no safe route that does not pass by a through a hazardous condition and displays a list of the marked locations and the personnel at any such locations to keyboard/display 234. Rescue efforts may then be focused on those areas. In one embodiment, keyboard/display 234 includes a printer so that hardcopy of any keyboard/display output may be printed.

In one embodiment, database 242 contains the names and titles and other information about the personnel (such as knowledge of CPR, whether the person has had special training in emergency conditions or rescue, etc.) indexed by the identifier of the employee's transponder or card used in the card reader. Communications subsystem 256 may look up such information using the identifier of the employee it stores to allow such information to be displayed in place of or in addition to the identifier of the employee it stores.

Communications subsystem 252 (and input/output 254) and personnel tracker 256 are not shown in FIG. 2B to avoid cluttering the Figure. However, there may be a communication subsystem and personnel tracker described above for each of the keyboard/displays 234A–234D, located near each of them. Alternatively, a portion of the communication subsystem and personnel tracker described above may be located near each of the keyboard/displays 234A–234D with the remainder of the communication subsystem and personnel tracker located in a central location. For example, the microphone and speaker, card readers or transponder receivers portions may be located at each of the keyboard/displays 234A–234D with the remainder of personnel tracker located centrally and supporting each portion. In a manner similar to messaging manager 250 described above, if a central portion of communication subsystem 252 and personnel tracker 252 is used to support multiple portions at each of the keyboard/displays 234A–234D, the central portion identifies the location of the keyboard/display located near the remaining portions of communications subsystem and personnel tracker using the port or address from which the information was received or other similar method, and then requesting the location from location identifier 232.

Method

Figure 3:
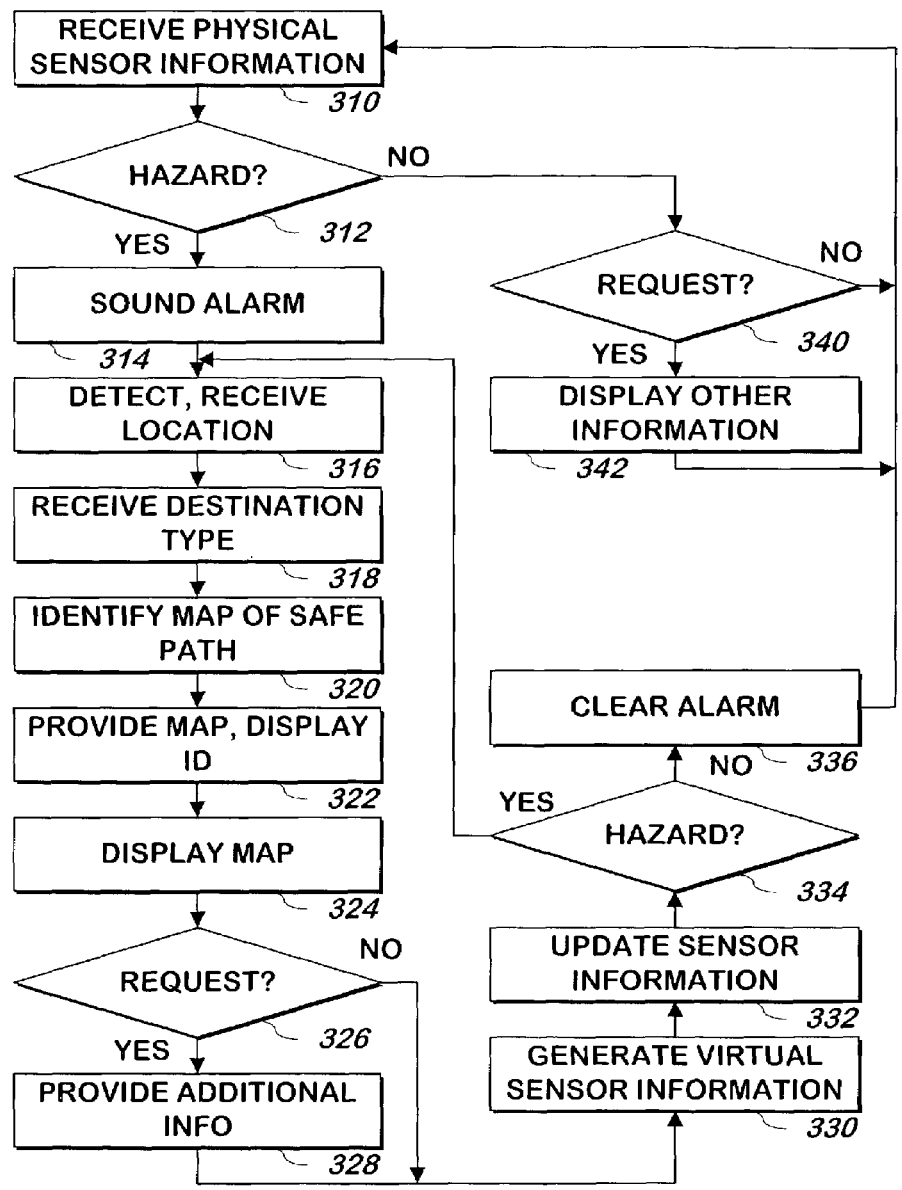
FIG. 3 is a flowchart illustrating a method of identifying and displaying information about a safe route to a destination according to one embodiment of the present invention.

Referring now to FIG. 3, a method of identifying and displaying information about a safe path to a destination is shown according to one embodiment of the present invention. The path may involve a tunnel, a path through a facility or either of these. Physical sensor information is received and optionally placed into a data structure 310 as described above. If the physical sensor information indicates no hazard as described above 312, a request may be received for other information such as information about which chemicals in solid, liquid or gaseous form are in use at different areas around the area, the work in process in the area, permit information and other information to allow decisions to be made about how to respond to the emergency. If such a request is received 340, the other information is displayed 342 as described above and the method continues at step 310, and otherwise 340, the method continues at step 310.

If the sensor information received at step 310 indicates a hazardous condition 312 as described above, an alarm may be sounded 314 as described above and the method continues at step 316.

A location of a display may be optionally detected and received 316 as described above and a destination may be optionally received 318 and a map or other description of a safe path is identified 320 using any of the techniques described above, including selecting it from a plurality of maps and generating it using a graph containing nodes and links and adding other landmarks as described above.

The map identified in step 320 is provided along with an optional display identifier 322 as described above and the map is displayed 324 optionally on a display corresponding to the display identifier received in step 322. A request for additional information as described above may be received, and if so 326, the additional information is provided 328 and the method continues at step 330, and otherwise 326, the method continues at step 330.

Figure 5A:
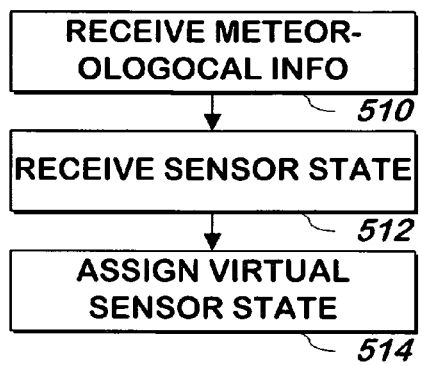
FIG. 5A is a flowchart illustrating a method of generating virtual sensor information according to one embodiment of the present invention.

At step 330, virtual sensor information is generated or updated as described above. Although step 330 is shown as being performed after at least one iteration of step 320, in other embodiments, step 330 may be performed before the first iteration of the identification of the safe path in step 320. The generation of virtual sensor information may be performed using a location assigned to the virtual sensor, time, the state and location of other sensors or any other condition as described above. For example, referring momentarily to FIG. 5A, a method of generating virtual sensor information is shown according to one embodiment of the present invention. Meteorological information such as wind speed and direction are received as described above 510. Sensor state and location of one or more sensors is received 512 as described above. A location assigned to a virtual sensor is received 514. A virtual sensor state is assigned using the meteorological information and sensor state, optionally the location of the sensor and the location assigned to the virtual sensor and optionally the time 514 as described above.

Referring again to FIG. 3, the physical sensor information is updated as described above 332. If an indication of a hazard still exists either from the physical sensor information or physical and virtual sensor information 334, the method continues at step 316, and otherwise 334, the alarm is cleared 336 and the method continues at step 310.

Figure 5B:
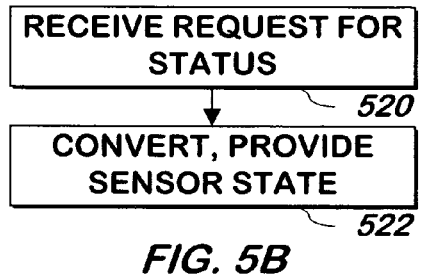
FIG. 5B is a flowchart illustrating a method of providing sensor status in response to a request according to one embodiment of the present invention.

Referring now to FIG. 5B, a method of providing status is shown according to one embodiment of the present invention. This method may be performed at any time during the operation of the method of FIG. 3. A request for status may be received 520. Sensor state may be converted as described above, having been stored as described above, and provided 522 to the party from which the request was received in step 520. State may be taken from sensors placed throughout a facility and those near a keyboard or display of a system that provides information related to a safe route as described above.

Figure 5E:
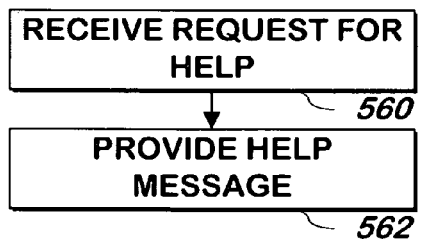
FIG. 5E is a flowchart illustrating a method of providing information responsive to a request for help according to one embodiment of the present invention.
Figure 5C:
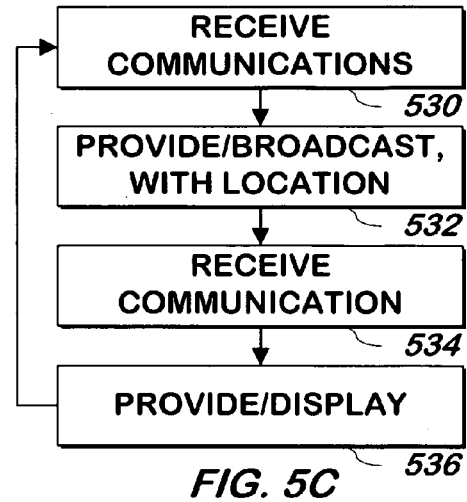
FIG. 5C is a flowchart illustrating a method of forwarding communications to and from personnel according to one embodiment of the present invention.

Referring now to FIG. 5C, a method of forwarding communications between two parties is shown according to one embodiment of the present invention. This method may be performed at any time during the operation of the method of FIG. 3. Communications such as voice or chat communications may be received 530. The communications may be forwarded to a specific device or devices or broadcast 532 to a number of devices as described above. Other communications may be received 534, such as those sent in response to the communications provided in step 532. The communications received in step 534 may be provided 536 such as displaying them on a screen or providing them to a speaker as described above, and the method may continue at step 530.

Figure 5D:
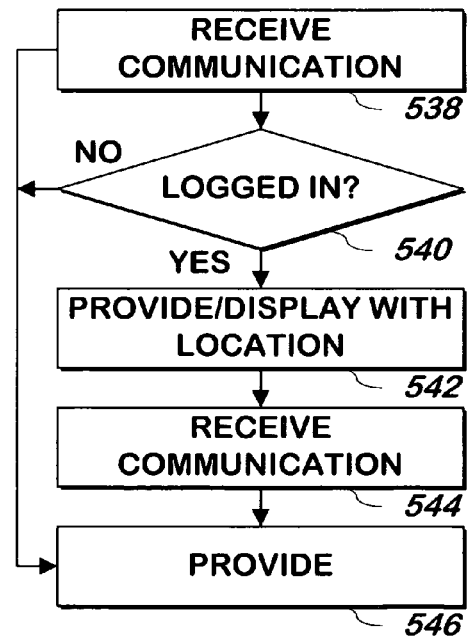
FIG. 5D is a flowchart illustrating forwarding communications to and from certain personnel logged in as emergency personnel according to one embodiment of the present invention.

Referring now to FIG. 5D, a method of forwarding communications is shown according to one embodiment of the present invention. A communication is received 538 as described above. If a user is logged in in a manner that identifies the user as capable of receiving communications 540, such as being logged in as a rescue personnel, the communication received is provided 542 such as displaying it on a screen or providing it to a speaker as described above. Communications received from the user logged in 544 may be provided 546 such as to the user who provided the communication received in step 538 as described above, and the method continues at step 538. If no user is logged in as described above 540, the communication received 538 may be discarded, although it may be displayed or otherwise provided by another device.

Referring now to FIG. 5E, a method of providing help information is shown according to one embodiment of the present invention. This method may be performed at any time during the operation of the method of FIG. 3. A request for help is received 560 and at least one help message corresponding to the request is provided in response to the request 562.

Referring now to FIG. 6A, a method of providing tracking information for multiple users is shown according to one embodiment of the present invention. This method may be performed at any time during the operation of the method of FIG. 3. Status information such as a user identifier is received such as via a card reader, touch screen button, or transceiver and a location identifier is received as described above 610 and both are provided, such as via broadcasting, as described above 612.

Referring now to FIG. 6B, a method of providing tracking information is shown according to one embodiment of the present invention. Status information such as an employee identifier is received with an identifier of the location of the employee 620, having been provided as described above. The status information and location are stored 622. Step 622 may involve overwriting prior status information for a same employee or marking the most recently received status information as current. Steps 620 and 622 may be part of an independently running process receiving status information for multiple employees and multiple locations for the same employee and so steps 620 and 624 may follow step 622.

At step 624, a request to provide status or provide status of personnel who do not have a safe route that avoids all hazards is received. If the request is a request to provide status, or tracking information for all locations 626, the status of a group of personnel such as all personnel whose location is known is retrieved 628 and provided 630 as described above and the method continues at step 620.

If the request is a request to provide status or tracking information for a selected location or locations, the status of a group of personnel such as all personnel whose location is known to be at the selected location or locations is retrieved 632 and provided 634 as described above and the method continues at step 620.

If the request is a request to provide status of personnel who do not have a safe path to an exit that avoids all hazards 626, the status and location information received in iterations of steps 620 and 622 may be sorted 640 by location so as to group employees by location and allow the processing of only locations at which employees are known to be located.

One of these locations not already selected is selected (all such locations are considered unselected at the end of step 640) 642 and a safe path to an exit or other type of location is identified as described above 644. If no such safe path is identified or a safe path is identified that is only accessible by passing through a hazard or a hazard of a particular type 646, the locations is marked as a location of stranded personnel 648 and if there are more unselected locations 650, the method continues at step 642 where the next unselected location will be selected. If there exists a safe path that does not pass through a hazard 646, the method skips step 648 and continues at step 650. At step 650, if there are no more unselected locations, the locations marked as stranded and personnel identifiers stored with any such locations, are displayed 652 and the method continues at step 620, and otherwise 650, the method continues at step 642.

In one embodiment, if changed status for a personnel is received during the course of execution of steps 640–652, the location for the personnel is updated and if no other personnel were located at that location when steps 640–650 were performed, steps 642–650 are reexecuted for the new locations not previously considered as part of step 652.

What is claimed is:

1. A method of providing for display, a map of at least a portion of a facility, comprising:
receiving at least one indication of at least one hazardous condition;
identifying the map of the at least the portion of the facility, the map showing at least one path, each path corresponding to a plurality of links, each link corresponding to a plurality of nodes, each node corresponding to a point at least near a path in the facility, the identifying being responsive to the at least one indication of the at least one hazardous condition, and to a plurality of metrics, each metric corresponding to one of the plurality of links; and
providing for display the map identified.

2. The method of claim 1 wherein the identifying the map step comprises identifying a map showing a route that avoids at least one of the at least one hazardous condition.

3. The method of claim 2 wherein the identifying the map step comprises selecting a map from a plurality of maps.

4. The method of claim 2 wherein at least one of the plurality of metrics comprises an amount of time it takes to traverse the corresponding link.

5. The method of claim 4 wherein at least one of the plurality of metrics comprises a capacity of at least a part of the path the corresponding link.

6. The method of claim 4 wherein the destination is an exit from an area in which at least one of the at least one hazards has occurred.

7. The method of claim 2 wherein the map comprises at least one landmark in a facility.

8. The method of claim 6 wherein the facility is a semiconductor manufacturing facility.

9. The method of claim 1 wherein the map is identified additionally responsive to at least one location.

10. The method of claim 9 wherein the location comprises an exit of an area in which at least one of the at least one hazards has occurred.

11. The method of claim 9 wherein the location comprises a starting location.

12. The method of claim 11 wherein the starting location is moveable.

13. The method of claim 1 wherein the providing for display step comprises providing the map for display on a device having a fixed location.

14. The method of claim 13 wherein the identifying the map step is additionally responsive to the fixed location of the device.

15. The method of claim 1 wherein the providing for display step comprises wirelessly transmitting at least one selected from:
   a. the map; and
   b. the at least one indication.

16. The method of claim 1 additionally comprising specifying the display from a plurality of displays.

17. The method of claim 1, additionally comprising displaying additional information.

18. The method of claim 17 wherein the additional information comprises information about at least one chemical in an area near the at least one hazardous condition.

19. The method of claim 18 wherein the additional information comprises information regarding work in process in an area near the hazardous condition.

20. The method of claim 18 wherein the additional information comprises permit information about at least one area near the hazardous condition.

21. The method of claim 1 additionally comprising forwarding a communication from a first party near a first location at which the map is displayed, to a second party at a second location different from the first location.

22. The method of claim 1 wherein the facility comprises at least one tunnel.

23. A computer program product comprising a computer useable medium having computer readable program code embodied therein for providing for display a map of at least a portion of a facility, the computer program product comprising computer readable program code devices configured to cause a computer system to:

receive at least one indication of at least one hazardous condition;

identify the map of the at least the portion of the facility, the map showing at least one path, each path corresponding to a plurality of links, each link corresponding to a plurality of nodes, each node corresponding to a point at least near a path in the facility, the computer readable program code devices configured to cause the computer system to identify being responsive to the at least one indication of the at least one hazardous condition, and to a plurality of metrics, each metric corresponding to one of the plurality of links; and provide for display the map identified.

24. A system for identifying a map of at least a portion of a facility, the system comprising:

a detector having at least one input for receiving at least one sensor state, the detector for providing at an output at least one indication of a hazardous condition responsive to the at least one sensor state;

a map identifier having an input coupled to the detector input for receiving the at least one indication of at least one hazardous condition, the map identifier for identifying the map of the at least the portion of the facility, the map showing at least one path, each path corresponding to a plurality of links, each link corresponding to a plurality of nodes, each node corresponding to a point at least near a path in the facility, the map identifier identifying the map responsive to the at least one indication of the at least one hazardous condition and providing at an output at least one indication of the map identified, and to a plurality of metrics, each metric corresponding to one of the plurality of links; and a map displayer having an input coupled to the map identifier for receiving the at least one indication of the map identified, and for providing for display via an output a map corresponding to the map identifier received at the map displayer input.

* * * * *